US008986058B2

(12) United States Patent
Saruwatari et al.

(10) Patent No.: US 8,986,058 B2
(45) Date of Patent: Mar. 24, 2015

(54) OUTBOARD MOTOR

(75) Inventors: Kimitaka Saruwatari, Shizuoka (JP); Katsumi Ochiai, Shizuoka (JP); Toshio Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 214 days.

(21) Appl. No.: 13/590,401

(22) Filed: Aug. 21, 2012

(65) Prior Publication Data
US 2013/0065462 A1 Mar. 14, 2013

(30) Foreign Application Priority Data

Sep. 8, 2011 (JP) ................................. 2011-196212
Mar. 19, 2012 (JP) ................................. 2012-061789

(51) Int. Cl.
F01N 13/00 (2010.01)
B63H 21/32 (2006.01)
F01P 7/16 (2006.01)
F01P 3/20 (2006.01)
F01N 3/10 (2006.01)

(52) U.S. Cl.
CPC ............... *B63H 21/32* (2013.01); *F01P 7/165* (2013.01); *F01P 3/202* (2013.01); *F01P 2060/04* (2013.01); *F01P 2060/10* (2013.01); *F01N 3/101* (2013.01); *Y02T 10/22* (2013.01)
USPC ........................................................ 440/89 H

(58) Field of Classification Search
USPC ........................................................ 440/89 H
IPC ........................................................ F01N 13/004
See application file for complete search history.

(56) References Cited

U.S. PATENT DOCUMENTS

| 6,890,228 | B2 * | 5/2005 | Tawa et al. ................... 440/88 J |
| 2008/0166935 | A1 | 7/2008 | Ito et al. |
| 2010/0240270 | A1 * | 9/2010 | Ochiai ........................ 440/89 H |

FOREIGN PATENT DOCUMENTS

JP 2008-169707 A 7/2008

* cited by examiner

*Primary Examiner* — Stephen Avila
(74) *Attorney, Agent, or Firm* — Keating & Bennett, LLP

(57) ABSTRACT

An outboard motor includes a cooling water passage that guides cooling water to cool an exhaust passage and a cylinder unit. A cooling water intake port draws external cooling water into the cooling water passage. A water pump draws cooling water into the cooling water intake port and supplies the cooling water to the cooling water passage. A thermostat is arranged in the cooling water passage downstream of the catalytic converter and the cylinder unit. A first bypass passage is connected to a first connecting section provided on the cooling water passage. The first connecting section is provided along the cooling water passage at a position farther downstream than the catalytic converter and farther upstream than the thermostat.

20 Claims, 17 Drawing Sheets

OUTBOARD MOTOR

BACKGROUND OF THE INVENTION

1. Field of the Invention

The present invention relates to an outboard motor.

2. Description of the Related Art

In recent years, outboard motors equipped with catalytic converters have been introduced to improve environmental performance. When a catalytic converter is installed in an outboard motor, it is necessary to provide a cooling structure to cool the catalytic converter. It is also necessary for the catalytic converter to be warmed to a prescribed temperature or higher to activate the catalyst. Therefore, in the outboard motor exhaust apparatus disclosed in Laid-open Japanese Patent Application 2008-169707, a thermostat is arranged in a cooling water flow passage downstream of the catalytic converter. The thermostat opens the cooling water flow passage when a temperature of the cooling water reaches or exceeds a prescribed temperature. The thermostat closes the cooling water passage when the temperature of the cooling water is below the prescribed temperature. Thus, the cooling water is stagnant until the catalytic converter reaches the prescribed temperature and, as a result, early activation of the catalyst is promoted.

Additionally, in the outboard motor exhaust apparatus disclosed in Laid-open Japanese Patent Application 2008-169707, a thermostat is arranged in the cooling water flow passage at a position downstream of the cylinder block. As a result, it is possible to warm up the cylinder block. Thus, when the cooling water passage is branched into two systems, the warming state of each of the systems can be controlled individually by providing a thermostat in each of the systems and opening and closing the thermostats according to the temperatures of the respective systems.

When the cooling water passage is branched into a plurality of systems, the total cross sectional area of the cooling water passage increases. Consequently, a larger water pump is necessary to feed the cooling water. A larger water pump is a problem because it requires a larger bottom casing to house the water pump.

Conversely, if the cooling water passage is not branched, then the total cross sectional area of the cooling water passage is not so large and a larger water pump can be avoided. However, when the cooling water passage is not branched, it is necessary to arrange a thermostat downstream of both the catalytic converter and the engine in order to warm up the catalytic converter and the engine. In such a case, the passage length of the cooling water passage from the water pump to the thermostat is long and it is easy for an uneven temperature distribution to occur along the cooling water passage. For example, when the engine is operated with a fully open throttle after starting, a situation occurs in which the cooling water temperature is high near the catalytic converter but low near the thermostat. In such a case, the thermostat will remain closed and the cooling water will be stagnant even though the catalytic converter is at a high temperature. Consequently, it is difficult to sufficiently cool the catalytic converter.

SUMMARY OF THE INVENTION

In view of the problems described above, preferred embodiments of the present invention provide an outboard motor in which the catalytic converter can be adequately cooled while preventing the necessity for a large water pump.

An output motor according to a preferred embodiment of the present invention includes an engine, an exhaust passage, a catalytic converter, a cooling water passage, a cooling water intake port, a water pump, a thermostat, and a first bypass passage. The engine includes a cylinder unit. The exhaust passage guides exhaust gas discharged from the cylinder unit to underneath the engine. The catalytic converter is provided in the exhaust passage. The cooling water passage guides cooling water to cool the exhaust passage and the cylinder unit. The cooling water intake port draws external cooling water into the cooling water passage. The water pump draws the cooling water into the cooling water intake port and supplies it to the cooling water passage. The thermostat is arranged farther downstream than the catalytic converter and the cylinder unit along the cooling water passage. The first bypass passage is connected to a first connecting section. The first connecting section is provided along the cooling water passage at a position downstream of the catalytic converter and upstream of the thermostat.

In the outboard motor according to a preferred embodiment of the present invention, the cooling water flowing into the cooling water passage cools the catalytic converter and the cylinder unit. Consequently, the water pump can be smaller than in a case where separate cooling water passages are provided. Also, the first bypass passage is connected to the cooling water passage at a position downstream of the catalytic converter and upstream of the thermostat. Consequently, even when the thermostat is closed, the cooling water flows through the first bypass passage and does not become stagnant at the catalytic converter. As a result, the catalytic converter can be cooled in a stable and reliable manner.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
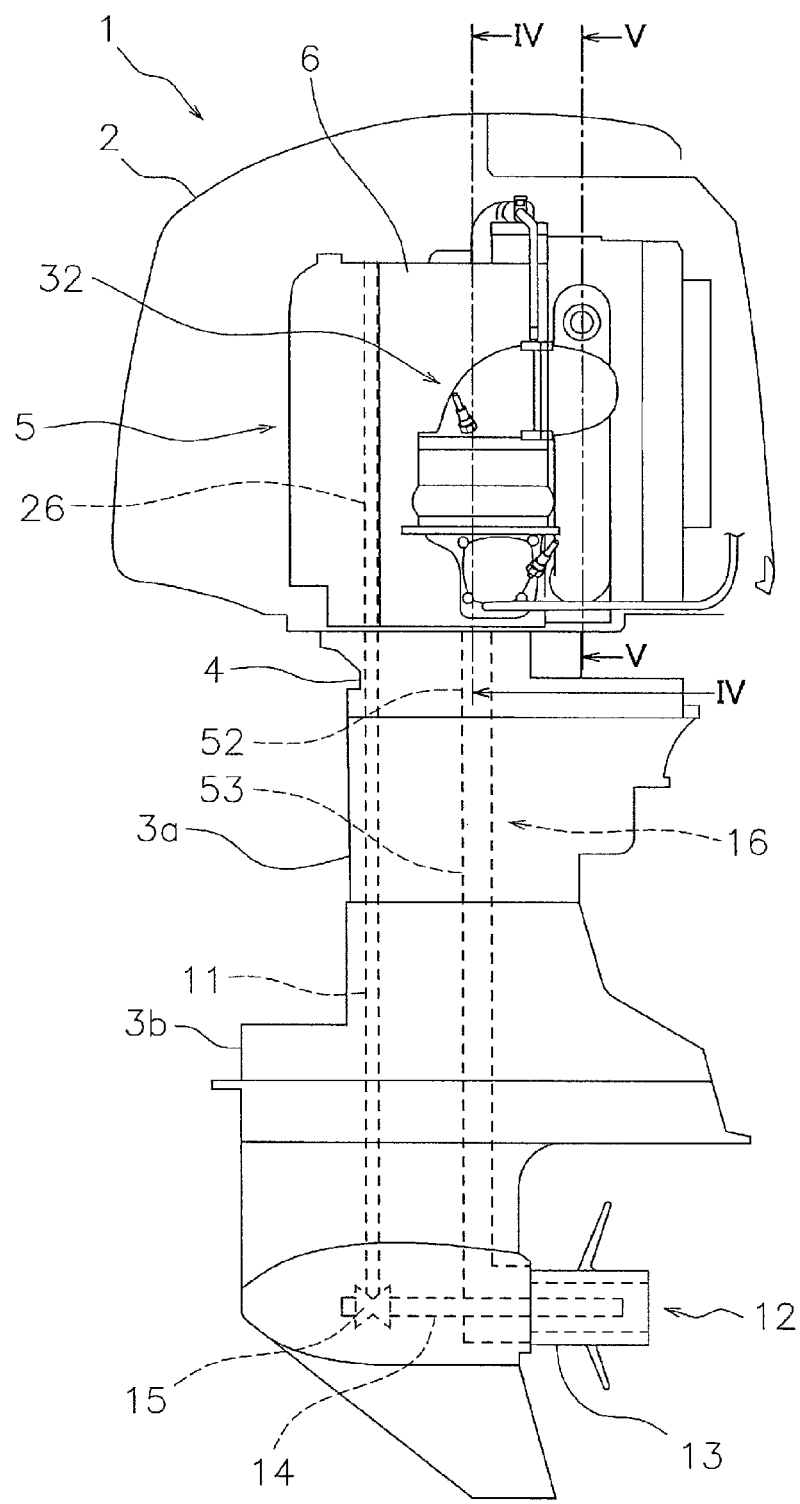
FIG. 1 is a left side view of an outboard motor according to a first preferred embodiment of the present invention.
Figure 2:
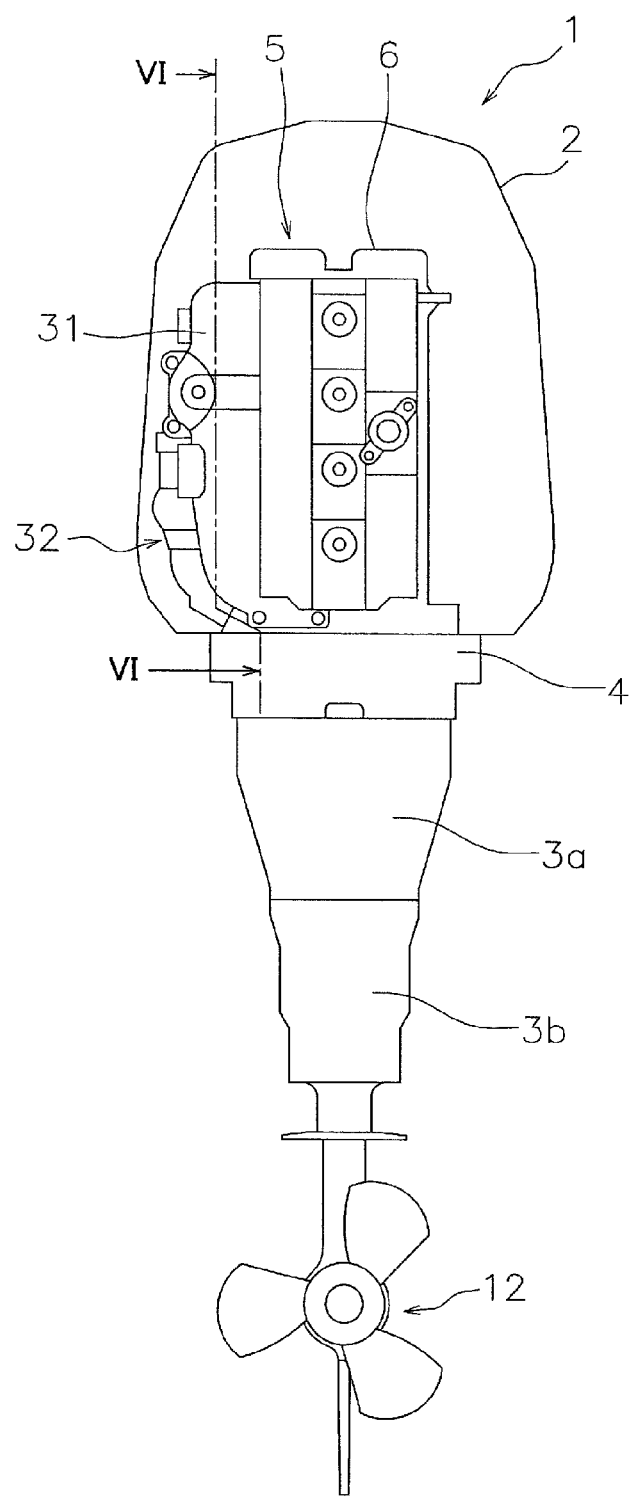
FIG. 2 is a rear view of an outboard motor according to the first preferred embodiment of the present invention.

FIG. 1 is a left side view of an outboard motor 1 according to a first preferred embodiment of the present invention. FIG. 2 is a rear view of an outboard motor 1 according to a first preferred embodiment of the present invention. As shown in FIG. 1 and FIG. 2, the outboard motor 1 of the present preferred embodiment includes an engine cover 2, an upper casing 3a, a lower casing 3b, an exhaust guide section 4, and an engine unit 5. In FIG. 1 and FIG. 2, the engine cover 2 is depicted in a cross sectional view in order to facilitate understanding. The engine cover 2, the upper casing 3a, and the engine unit 5 are preferably fixed to the exhaust guide section 4. The lower casing 3b is arranged below the upper casing 3a.

The engine unit 5 is arranged inside the engine cover 2. The engine unit 5 includes an engine 6. As shown in FIG. 1, a drive shaft 11 is arranged inside the upper casing 3a and the lower casing 3b. The drive shaft 11 is arranged to be oriented along a vertical or substantially vertical direction inside the upper casing 3a and the lower casing 3b. The drive shaft 11 is fixed to a crankshaft 26 of the engine 6. A propeller 12 is arranged underneath the lower casing 3b. The propeller 12 is arranged below the engine 6. The propeller 12 includes a propeller boss 13. A propeller shaft 14 is arranged inside the propeller boss 13. The propeller shaft 14 is arranged to be oriented along a front-to-rear direction. The propeller shaft 14 connects to a bottom portion of the drive shaft 11 through a bevel gear 15.

In the outboard motor 1, a drive force generated by the engine 6 is transmitted through the drive shaft 11 and the propeller shaft 14 to the propeller 12. In this way, the propeller 12 is rotated in a forward direction or a reverse direction. As a result, a propulsion force is generated to propel the watercraft body on which the outboard motor is installed in a forward or a reverse direction.

As shown in FIG. 1, the outboard motor 1 includes an exhaust passage 16. The exhaust passage 16 is preferably arranged such that it extends from the engine 6 to the propeller boss 13 of the propeller 12 by passing through the insides of the exhaust guide section 4, the upper casing 3a, and the lower casing 3b. The exhaust gas discharged from the engine 6 passes from the exhaust passage 16 through the inside of the propeller boss 13 and into the water.

Figure 3:
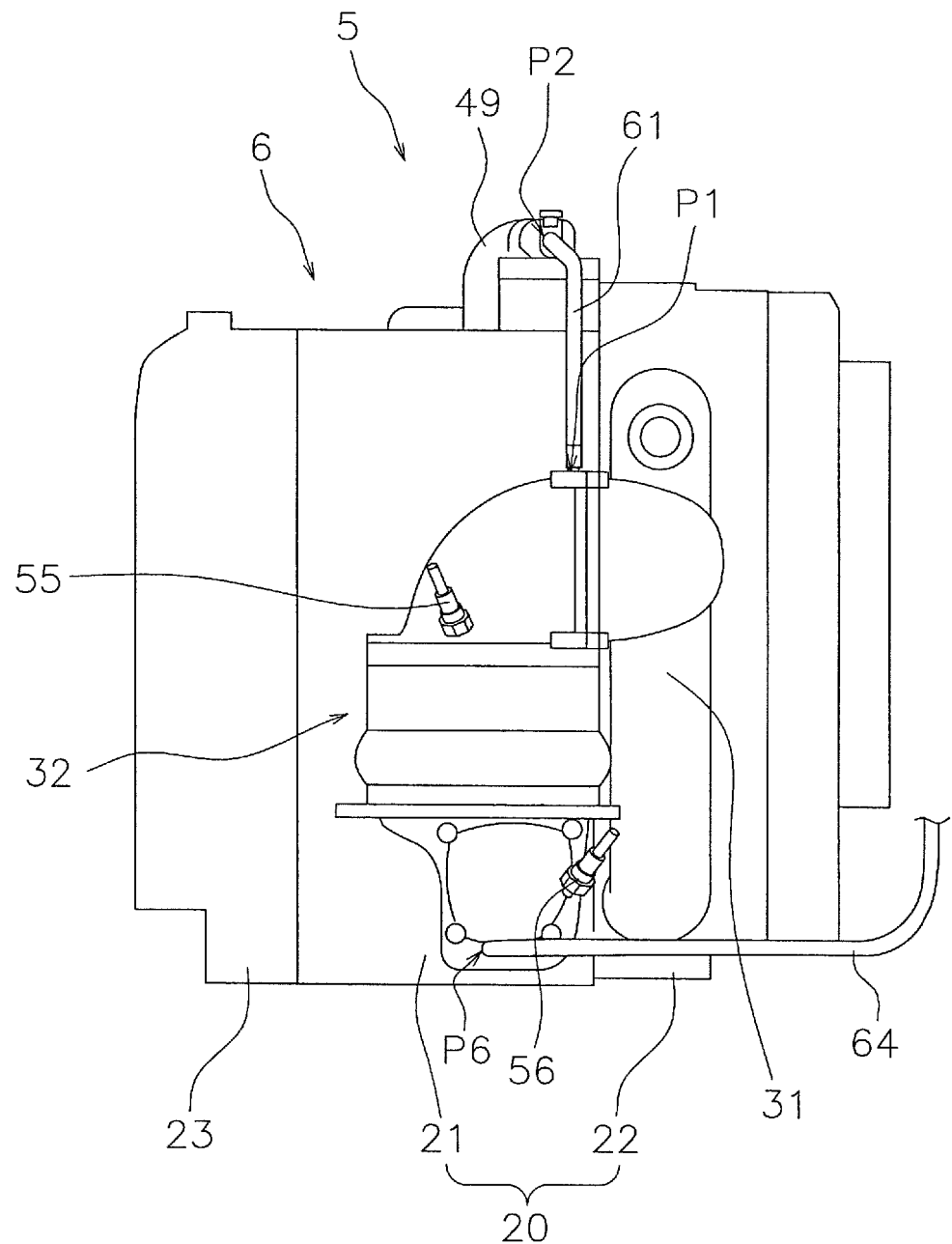
FIG. 3 is a left side view of an engine unit of the outboard motor according to the first preferred embodiment of the present invention.
Figure 4:
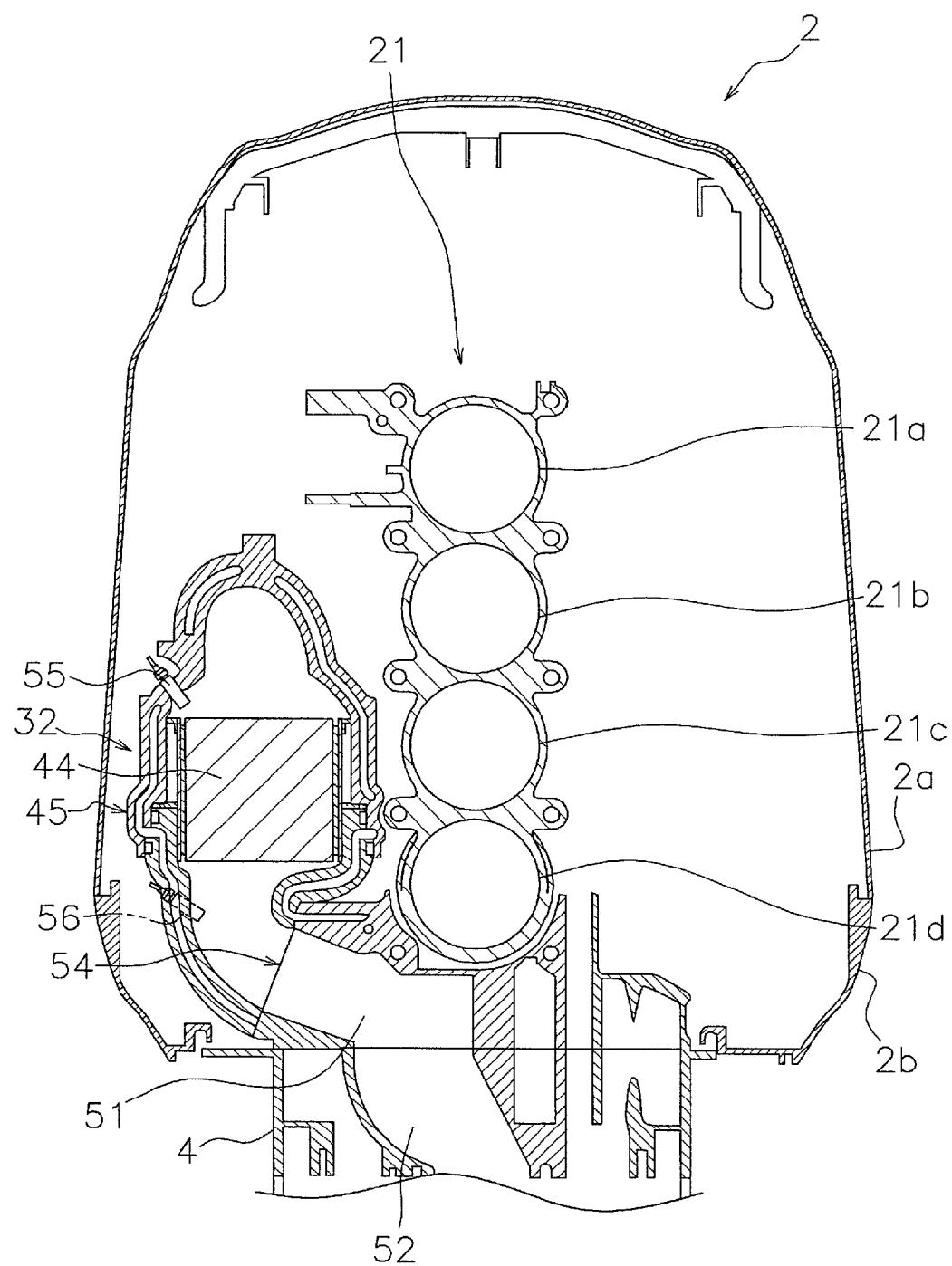
FIG. 4 is a cross sectional view taken along section line IV-IV of FIG. 1.

FIG. 3 is a left side view of an engine unit 5. As shown in FIG. 3, the engine 6 includes a cylinder unit 20 and a crankcase 23. The cylinder unit 20 includes a cylinder block 21 and a cylinder head 22. The cylinder block 21 is arranged above the exhaust guide section 4 and fixed to the exhaust guide section 4. FIG. 4 is a cross sectional view taken along a section line IV-IV of the outboard motor 1 as shown in FIG. 1. As shown in FIG. 4, the cylinder block 21 preferably includes four cylinders 21a to 21d, for example. The four cylinders 21a to 21d are preferably arranged side-by-side along a vertical or substantially vertical direction.

Figure 5:
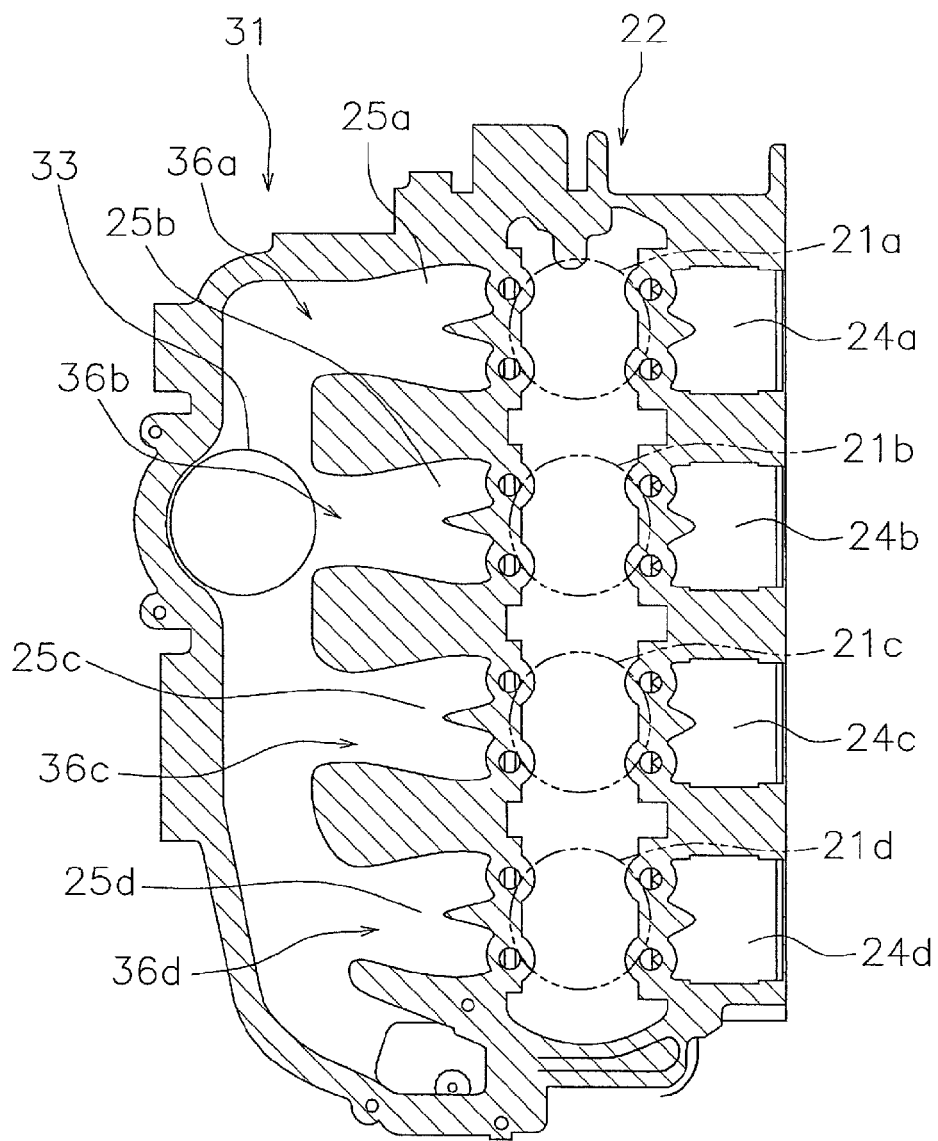
FIG. 5 is a cross sectional view taken along section line V-V of FIG. 1.

As shown in FIG. 3, the cylinder head 22 is arranged rearward of the cylinder block 21. FIG. 5 is a cross sectional view taken along a section line V-V of the outboard motor 1 as shown in FIG. 1. As shown in FIG. 5, intake ports 24a to 24d and exhaust ports 25a to 25d are provided in the cylinder head 22. One of the intake ports 24a to 24d and one of the exhaust ports 25a to 25d are connected to each of the cylinders 21a to 21d, respectively. The intake ports 24a to 24d are arranged side-by-side along a vertical or substantially vertical direction. The intake ports 24a to 24d are connected to a fuel delivery device (not shown). The exhaust ports 25a to 25d are arranged side-by-side along a vertical or substantially vertical direction. The exhaust ports 25a to 25d extend laterally and connect to an exhaust manifold 31 (explained below).

As shown in FIG. 3, the crankcase 23 is arranged frontward of the cylinder block 21. The crankshaft 26 (see FIG. 1) is arranged inside the crankcase 23. The crankshaft 26 extends along a vertical or substantially vertical direction. A lower end portion of the crankshaft 26 is connected to an upper end portion of the aforementioned drive shaft 11. The movement of pistons (not shown in the drawings) arranged inside the cylinders 21a to 21d is transmitted to the drive shaft 11 through the crankshaft 26.

As shown in FIG. 3, the engine unit 5 includes the exhaust manifold 31. The exhaust manifold 31 is arranged alongside the cylinder head 22. The exhaust manifold 31 preferably is a one-piece integral unit with the cylinder head 22, for example. The exhaust manifold 31 is arranged to extend along a vertical or substantially vertical direction. As shown in FIG. 5, a plurality of openings 36a to 36d are provided in the exhaust manifold 31 and the exhaust manifold 31 communicates with the exhaust ports 25a to 25d through the openings 36a to 36d. Exhaust gas discharged from the exhaust ports 25a to 25d is collected in the exhaust manifold 31. The exhaust manifold 31 includes a first opening 33. The first opening 33 is positioned between the uppermost cylinder 21a and the lowermost cylinder 21d of the cylinders 21a to 21d.

Figure 6:
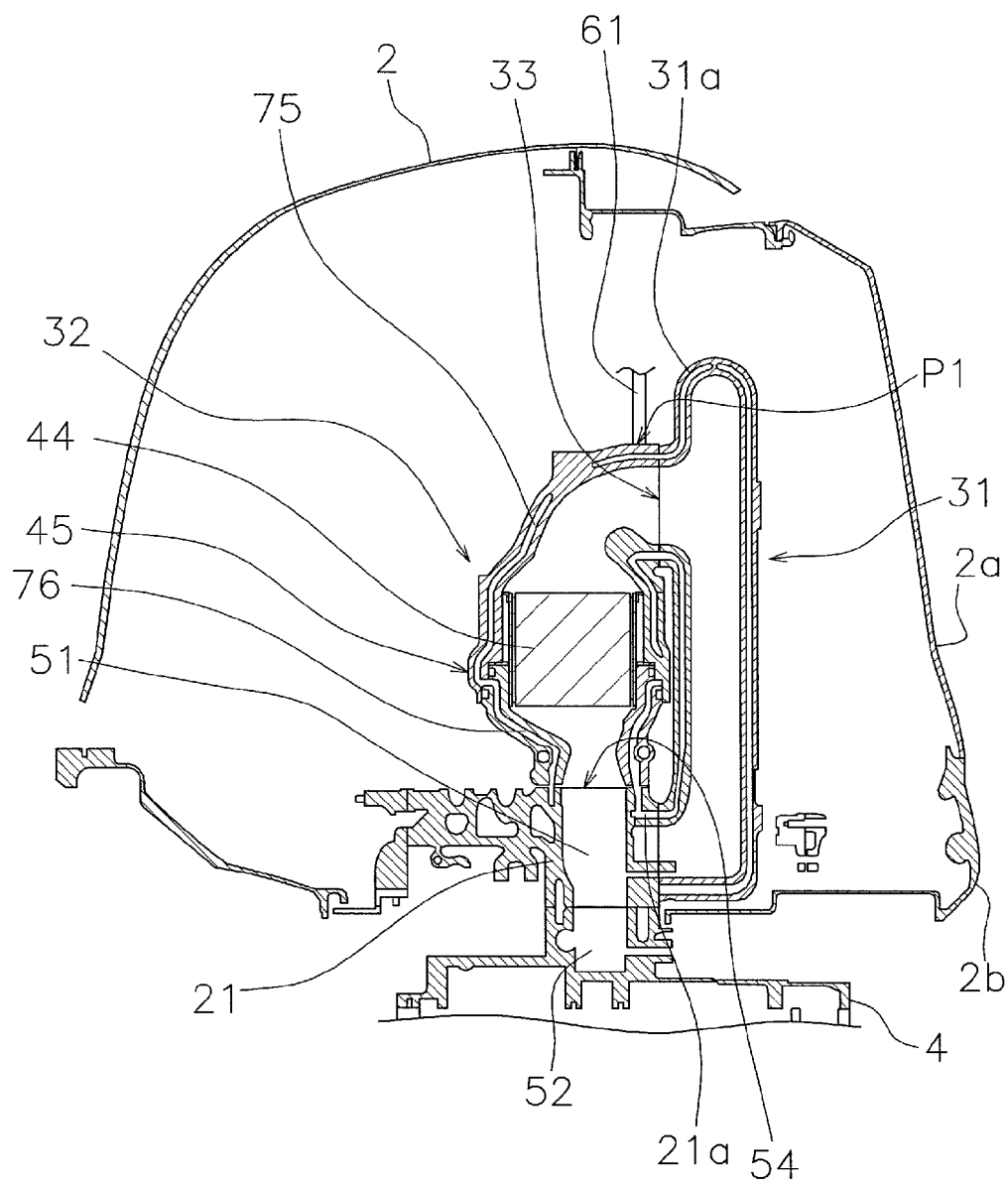
FIG. 6 is a cross sectional view taken along section line VI-VI of FIG. 2.

As shown in FIG. 3, the engine unit 5 includes a catalytic converter unit 32. As shown in FIG. 4 and FIG. 6, the catalytic converter unit 32 includes a catalyst member 44 and a catalyst housing pipe 45. The catalyst member 44 is arranged in the exhaust passage 16 inside the catalyst housing pipe 45. The catalytic converter unit 32 is arranged alongside the engine 6. Thus, the catalyst member 44 is arranged alongside the engine 6. More specifically, the catalyst member 44 is positioned higher than a lower edge portion of the cylinder 21d positioned lowest among the four cylinders 21a to 21d. The catalyst housing pipe 45 is preferably arranged horizontally adjacent to the exhaust manifold 31. The catalyst housing pipe 45 is arranged to extend in a vertical or substantially vertical direction. One end of the catalyst housing pipe 45 is connected to the first opening 33 of the exhaust manifold 31. The other end of the catalyst housing pipe 45 is connected to a second opening 54 of the cylinder block 21 that will be explained below. The catalyst member 44 supports the catalyst that serves to clean the exhaust gas. The catalyst used is, for example, a three-way catalyst. The catalyst member 44 preferably is preferably a circular cylindrical member including a honeycomb structure, for example. The exhaust gas flows from above to below through the catalyst member 44. The exhaust gas flowing through the exhaust passage 16 is cleaned as it passes through the catalyst member 44 inside the catalyst housing pipe 45.

The exhaust manifold 31 and the catalytic converter unit 32 define a portion of the exhaust passage 16. The exhaust passage 16 also includes a first lower passage 51, a second lower passage 52, and a third lower passage 53. The first lower passage 51 is provided inside the cylinder block 21. The first lower passage 51 includes the second opening 54. The second opening 54 is provided in a lower portion of a side surface of the cylinder block 21. The first lower passage 51 is connected to the catalytic converter unit 32 through the second opening 54. The second lower passage 52 is preferably provided inside the exhaust guide section 4. As shown in FIG. 4 and FIG. 6, the second lower passage 52 is connected to the first lower passage 51. As shown in FIG. 1, the third lower passage 53 is provided inside the upper casing 3a and the lower casing 3b. The third lower passage 53 is connected to the second lower passage 52. The third lower passage 53 is also connected to the propeller boss 13.

In the outboard motor 1 according to the present preferred embodiment, exhaust gas discharged from the cylinder unit 20 is guided by the exhaust passage 16 from the cylinders to underneath the engine. More specifically, exhaust gas from the exhaust ports 25a to 25d of the engine 6 collects in the exhaust manifold 31. The exhaust gas flows from the exhaust manifold 31 to the catalytic converter unit 32. The exhaust gas is cleaned as it passes through the catalyst member 44 in the catalytic converter unit 32. The exhaust gas then passes from the catalytic converter unit 32 through the first lower passage 51, the second lower passage 52, the third lower passage 53, and the inside of the propeller boss 13 and is discharged to the outside.

As shown in FIG. 3 and FIG. 4, the catalytic converter unit 32 is equipped with a first oxygen sensor 55 and a second oxygen sensor 56 to detect an oxygen concentration of the exhaust gas. The first oxygen sensor 55 is arranged farther upstream than the catalyst member 44 inside the exhaust passage 16. More specifically, the first oxygen sensor 55 is arranged above the catalyst member 44 inside the catalyst housing pipe 45. The second oxygen sensor 56 is arranged below the catalyst member 44 inside the catalyst housing pipe 45. The second oxygen sensor 56 is arranged downstream of the catalyst member 44 inside the exhaust passage 16. Detection signals from the first oxygen sensor 55 and the second oxygen sensor 56 are fed to an ECU not shown in the drawings. The ECU controls the engine 6 based on detection values from the first oxygen sensor 55 and the second oxygen sensor 56.

Figure 7:
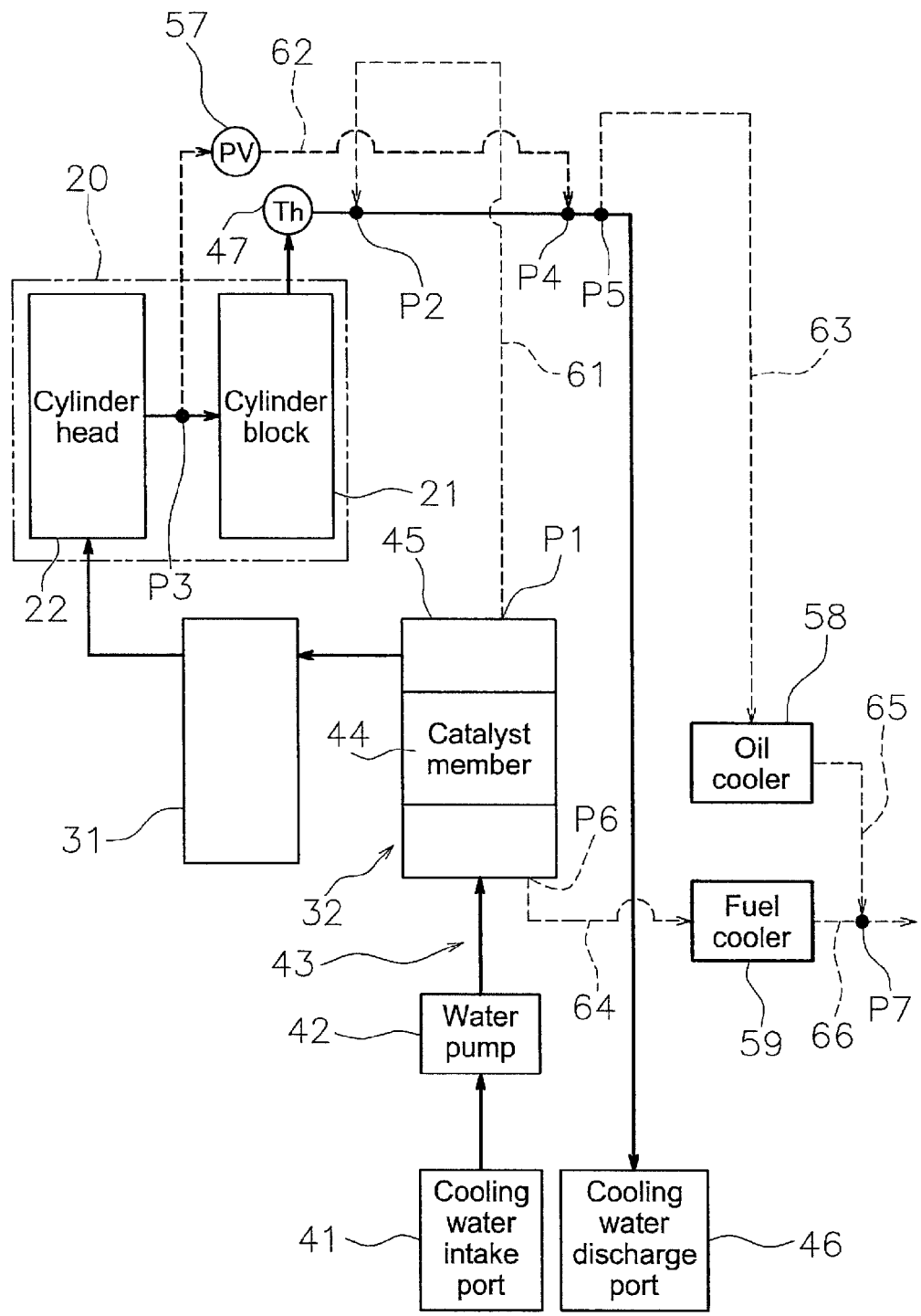
FIG. 7 is a block diagram of a cooling system of the outboard motor according to the first preferred embodiment of the present invention.

FIG. 7 is a simplified view of a cooling system of the outboard motor 1 according to the present preferred embodiment. As shown in FIG. 7, the cooling system of the outboard motor 1 includes a cooling water intake port 41, a water pump 42, a cooling water passage 43, and a cooling water discharge port 46. The cooling water intake port 41 is provided in the lower casing 3b. External cooling water is drawn into the cooling water passage 43 through the cooling water intake port 41. The water pump 42 draws cooling water via the cooling water intake port 41 and feeds the cooling water to the cooling water passage 43. The water pump 42 is preferably arranged inside the lower casing 3b. The cooling water passage 43 guides the cooling water to cool the exhaust passage 16 and the cylinder unit 20. The cooling water passage 43 is preferably arranged such that it passes through the catalytic converter unit 32, the exhaust passage manifold 31, the cylinder head 22, and the cylinder block 21. The catalytic converter unit 32 is preferably arranged in the cooling water passage 43 at a position upstream of the exhaust manifold 31. The exhaust manifold 31 is preferably arranged upstream of the cylinder head 22. The cylinder head 22 is preferably positioned upstream of the cylinder block 21. Therefore, the catalyst member 44 is positioned farther upstream than the cylinder head 22. The cooling water outlet port 46 is provided in the lower casing 3b. The cooling water in the cooling water passage 43 is discharged to the outside through the cooling water discharge port 46.

A thermostat 47 is arranged in the cooling water passage 43 farther downstream than the catalyst member 44 and the cylinder unit 20. The thermostat 47 is preferably positioned downstream of the cylinder block 21. The thermostat 47 is preferably arranged such that its center axis extends in a vertical or substantially vertical direction. The thermostat 47 opens the cooling water passage 43 when a temperature of the cooling water is equal to or higher than a prescribed temperature. The thermostat 47 closes the cooling water passage 43 when the temperature of the cooling water is lower than the prescribed temperature.

Figure 8:
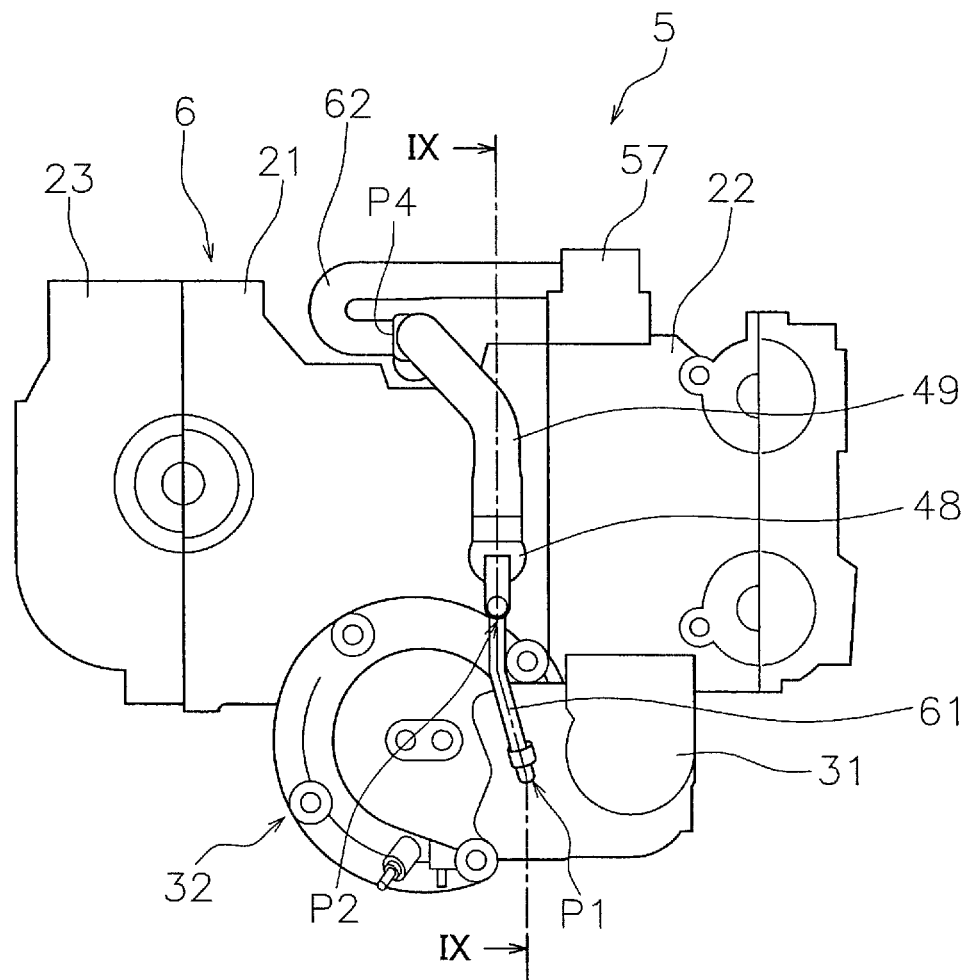
FIG. 8 is a top plan view of the engine unit of the outboard motor according to the first preferred embodiment of the present invention.
Figure 9:
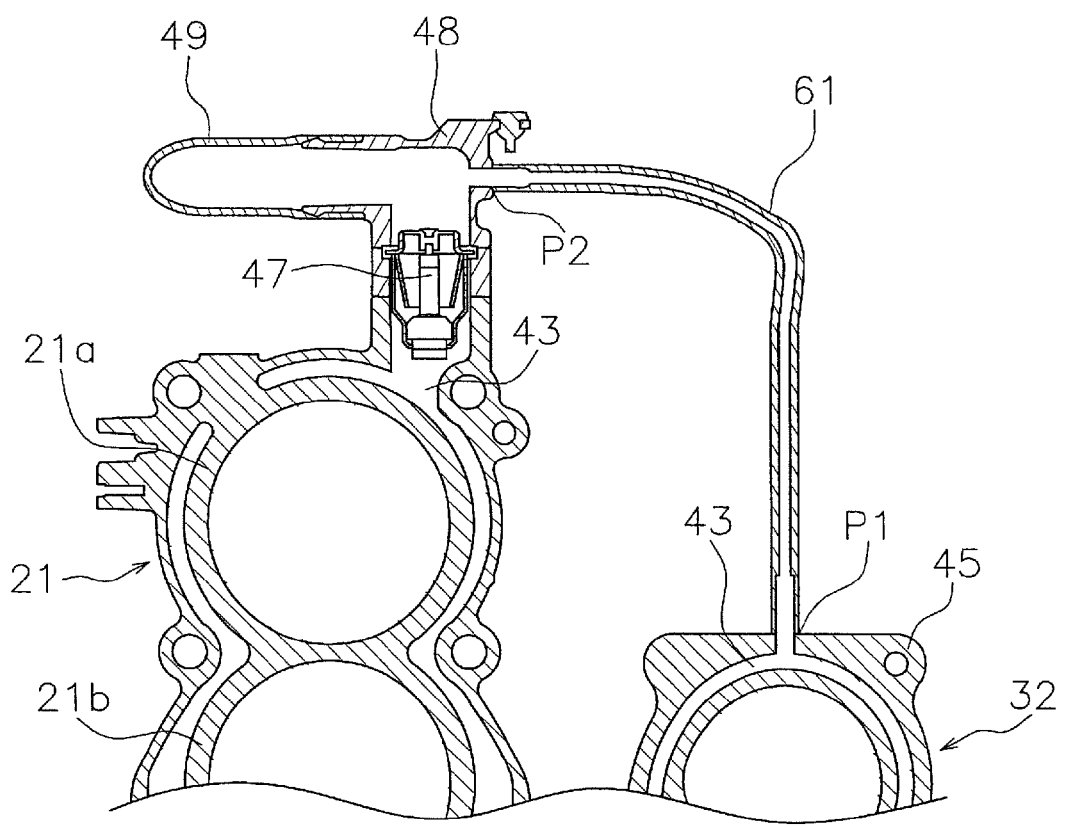
FIG. 9 is a cross sectional view taken along section line IX-IX of FIG. 8.

The cooling system of the outboard motor 1 includes a first bypass passage 61 and a second bypass passage 62. The first bypass passage 61 is connected between a first connecting section P1 and a second connecting section P2 along the cooling water passage 43. The first connecting section P1 is positioned downstream of the catalyst member 44. The second connecting section P2 is positioned downstream of the thermostat 47. Preferably, the second connecting section P2 is positioned immediately downstream of the thermostat 47. The cross sectional area of the first bypass passage 61 is preferably smaller than the cross sectional area of the cooling water passage 43. For example, the cross sectional area of the first bypass passage 61 is preferably equal to or larger than about 1/40 and smaller than or equal to about 1/10 of the cross sectional area of the cooling water passage 43, for example. FIG. 8 is a top plan view of an engine unit 5. FIG. 9 is a sectional view taken along a section line IX-IX of FIG. 8. As shown in FIG. 3, FIG. 8, and FIG. 9, the first bypass passage 61 preferably includes a hose-shaped member arranged on exteriors of the engine 6, the exhaust manifold 31, and the catalytic converter unit 32. As shown in FIG. 3, the first bypass passage 61 is connected to an upper portion of the catalytic converter unit 32. That is, the first connecting section P1 is arranged on the upper portion of the catalytic converter unit 32. The first bypass passage 61 extends upward from the catalytic converter 32 and connects to an upper portion of the cylinder unit 20. The second connecting section P2 is positioned above the cylinder unit 20. As shown in FIG. 6, the first connecting section P1 is positioned higher than the catalyst member 44. As shown in FIG. 9, the first bypass passage 61 is preferably connected to the cooling water passage 43 inside the catalytic converter unit 32. A thermostat cover 48 is attached to an upper portion of the cylinder unit 20. The thermostat cover 48 covers the thermostat 47. The thermostat cover 48 constitutes a portion of the cooling water passage 43. Thus, the internal space of the thermostat cover 48 communicates with the cooling water passage 43 inside the cylinder block 21. The first bypass passage 61 is preferably connected to the thermostat cover 48. Thus, the second connecting section P2 is provided on the thermostat cover 48. The second connecting section P2 is positioned downstream of the thermostat 47 inside the thermostat cover 48.

Figure 10:
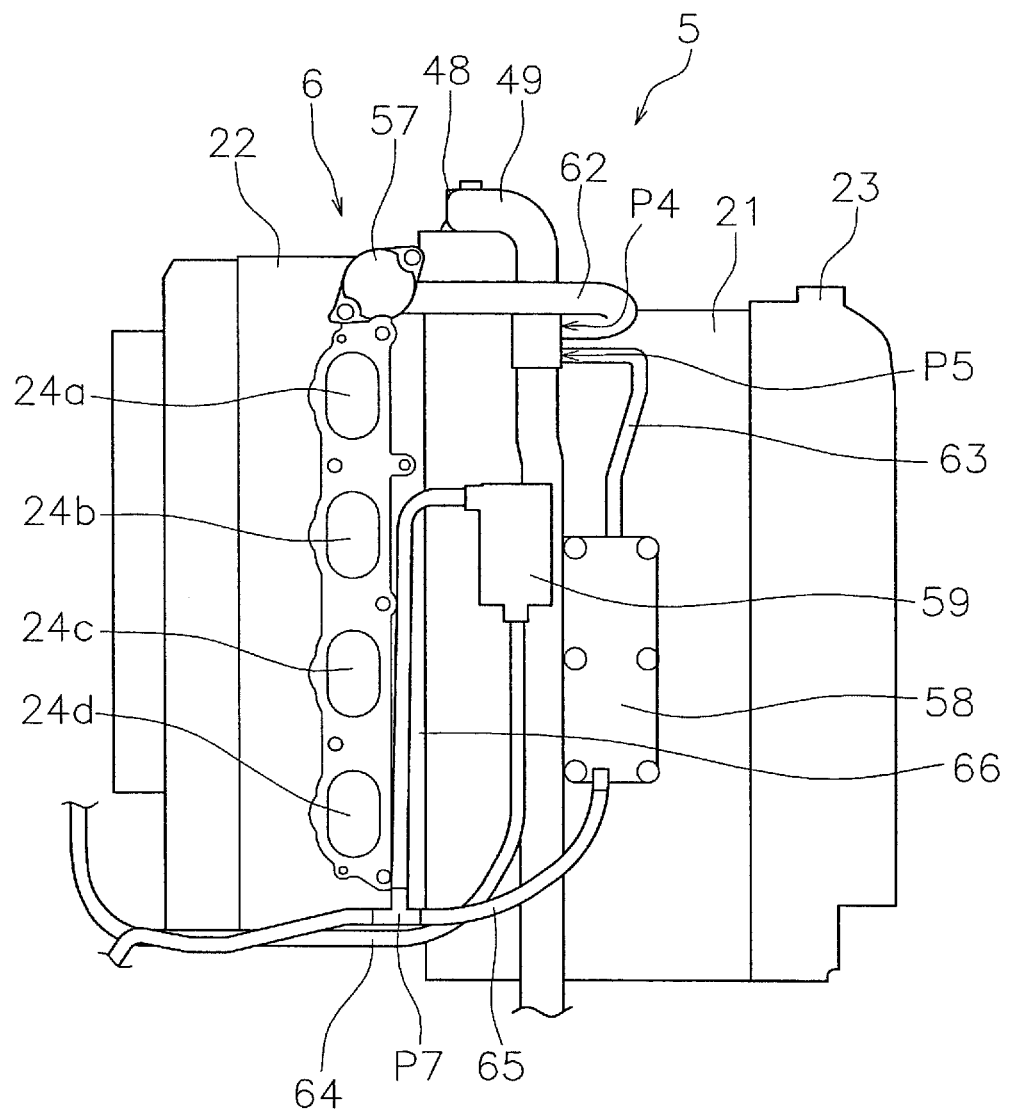
FIG. 10 is a right side view of the engine unit of the outboard motor according to the first preferred embodiment of the present invention.

FIG. 10 is a right side view of an engine unit 5. FIG. 10 shows the cylinder head 22 with the fuel delivery device removed from the intake ports 24a to 24d. As shown in FIG. 8, FIG. 9, and FIG. 10, the thermostat cover 48 is connected to a cooling water passage member 49. The cooling water passage member 49 preferably includes a hose-shaped member arranged on the exteriors of the engine 6, the exhaust manifold 31, and the catalytic converter unit 32. The cooling water passage member 49 constitutes a portion of the cooling water passage 43 that extends downstream from the thermostat cover 48. The cross sectional area of the cooling water passage member 49 is preferably larger than the cross sectional area of the first bypass passage 61. The cooling water passage member 49 extends from the thermostat cover 48 and preferably runs along an upper surface of the engine 6 toward a right side surface of the engine 6. The cooling water passage member 49 also extends downward along the right side surface of the engine 6. The cooling water passage member 49 connects (not shown in drawings) to the cooling water passage 43 arranged inside the exhaust guide section 4, the upper casing 3a, and the lower casing 3b As shown in FIG. 7, the second bypass passage 62 connects between a third connecting section P3 and a fourth connecting section P4 along the cooling water passage 43. The third connecting section P3 is positioned downstream of the catalyst member 44. The third connecting section P3 is preferably positioned inside the cylinder unit 20. More specifically, the third connecting section P3 is preferably positioned between the cylinder head 22 and the cylinder block 21 along the cooling water passage 43. The fourth connecting section P4 is positioned downstream of the thermostat 47. The fourth connecting section P4 is preferably positioned downstream of the second connecting section P2. A water pressure control valve 57 is arranged in the second bypass passage 62. The water pressure control valve 57 opens when the water pressure in the cooling water passage 43 is higher than a prescribed water pressure. The water pressure control valve 57 is closed when the water pressure in the cooling water passage 43 is equal to or lower than the prescribed water pressure. As shown in FIG. 8 and FIG. 10, the water pressure control valve 57 is preferably attached to an upper portion of the right side surface of the engine 6. The second bypass passage 62 preferably includes a hose-shaped member arranged on the exteriors of the engine 6, the exhaust manifold 31, and the catalytic converter unit 32. The second bypass passage 62 preferably extends from the water pressure control valve 57 along a rear-to-front direction. The second bypass passage 62 folds back rearward at a position farther frontward than the cooling water passage member 49 and connects to the cooling water passage member 49. The fourth connecting section P4 is provided on the cooling water passage member 49 and positioned rightward of the engine 6.

As shown in FIG. 7, the cooling system of the outboard motor 1 includes a first branch passage 63 and a second branch passage 64. The first branch passage 63 connects to a fifth connecting section P5 along the cooling water passage 43. The fifth connecting section P5 is positioned downstream of the fourth connecting section P4. The first branch passage 63 is also connected to an oil cooler 58. The oil cooler 58 cools lubricating oil used in the engine 6. The first branch passage 63 supplies cooling water to the oil cooler 58. As shown in FIG. 10, the oil cooler 58 is arranged on a right-hand side of the engine 6. The first branch passage 63 preferably includes a hose-shaped member arranged on the exteriors of the engine 6, the exhaust manifold 31, and the catalytic converter unit 32. The cross sectional area of the first branch passage 63 is preferably smaller than the cross sectional area of the cooling water passage 43. For example, the cross sectional area of the first branch passage 63 preferably is equal to or larger than about 1/40 and smaller than or equal to about 1/10 of the cross sectional area of the cooling water passage 43, for example. The fifth connecting section P5 is provided on the cooling water passage member 49 and positioned rightward of the engine 6. A first water discharge passage 65 is connected to the oil cooler 58. The first water discharge passage 65 is connected to a water discharge port (not shown in the drawings) provided on the engine cover 2 or the lower casing 3b. Similarly to the first branch passage 63, the cross sectional area of the first water discharge passage 65 is preferably smaller than the cross sectional area of the cooling water passage 43.

The second branch passage 64 is connected to a sixth connecting section P6 along the cooling water passage 43. The sixth connecting section P6 is positioned upstream of the catalyst member 44. The second branch passage 64 is connected to a fuel cooler 59. The fuel cooler 59 cools fuel used in the engine 6. The second branch passage 64 supplies cooling water to the fuel cooler 59. As shown in FIG. 10, the fuel cooler 59 is arranged rightward of the engine 6. The second branch passage 64 preferably includes a hose-shaped member arranged on the exteriors of the engine 6, the exhaust manifold 31, and the catalytic converter unit 32. The cross sectional area of the second branch passage 64 is preferably smaller than the cross sectional area than the cooling water passage 43. For example, the cross sectional area of the second branch passage 64 preferably is equal to or larger than about 1/40 and smaller than or equal to about 1/10 of the cross sectional area of the cooling water passage 43, for example. The second connecting section P6 is preferably provided on a lower portion of the catalytic converter unit 32 and positioned leftward of the engine 6. As shown in FIG. 3 and FIG. 10, the second branch passage 64 passes to the rear of the engine 6 so as to extend from the left side of the engine 6 to the right side of the engine 6. The fuel cooler 59 is also connected to a second water discharge passage 66. The second water discharge passage 66 connects to the first water discharge passage 65 at a seventh connecting section P7. Similarly to the second branch passage 64, the cross sectional area of the second water discharge passage 66 is preferably smaller than the cross sectional area of the cooling water passage 43.

Since the cooling water passage 43 is a single system to cool the catalyst member 44 and the cylinder unit 20, a smaller water pump 42 can be used in the outboard motor 1 according to the present preferred embodiment than in the case where separate cooling water passages 43 are provided for the catalyst member 44 and the cylinder unit 20. Also, the number of parts such as thermostats and sensors can be minimized. Since the number of thermostats can be minimized, the serviceability of the outboard motor 1 can be improved. Additionally, a higher degree of freedom with respect to the arrangement of thermostats and the layout of the cooling water passage can be obtained. Since the first bypass passage 61 is connected downstream of the catalyst member 44 and downstream of the thermostat 47, the cooling water can flow to the catalyst member 44 without becoming stagnant even when the thermostat 47 is closed. As a result, the catalyst member 44 can be cooled in a stable and reliable manner.

Since the cross sectional area of first bypass passage 61 is preferably smaller than the cross sectional area of the cooling water passage 43, the amount by which the flow rate of the cooling water increases due to the addition of the first bypass passage 61 is small. Consequently, the addition of the first bypass passage 61 does not cause a large increase in the required capacity of the water pump 42.

Since the first bypass passage 61 is connected to the thermostat cover 48, cooling water can easily flow immediately downstream of the thermostat 47 through the first bypass passage 61. Consequently, when the thermostat 47 is frozen, the thermostat 47 can be defrosted more quickly. Thus, for example, the outboard motor can be used in extreme environments such as on a sea in very cold locations. In such an environment, cooling water easily becomes frozen around the thermostat while the watercraft is moored. In such a case, even if the engine can be started, there is a possibility that thermostat will remain frozen and not operate. With an outboard motor 1 according to the present preferred embodiment, the thermostat 47 can be thawed more quickly in such a situation.

The second bypass passage 62 is connected downstream of the cylinder head 22. Consequently, the cooling water can flow stably and reliably to the cylinder head 22 when the water pressure control valve 57 is open. As a result, the cylinder head 22 can be cooled in a stable and reliable manner. Additionally, the second bypass passage 62 is connected upstream of the cylinder block 21 such that warming of the cylinder block 21 can be accomplished easily. As a result, dilution of the oil with fuel can be minimized in comparison with a case in which the cylinder block 21 is always cooled. In particular, as explained previously, since the cooling water passage is arranged such that the cooling water flows to the cylinder head 22 before flowing to the cylinder block 21, it is preferable for the third connecting section P3 to be positioned farther downstream than the cylinder head 22 and farther upstream than the cylinder block 21.

In the cooling water passage 43, the cylinder unit 20 is positioned downstream of the catalyst member 44. As a result, warming of the cylinder head 20 can be accomplished easily.

The first connecting section P1 to which the first bypass passage 61 connects is positioned above the catalyst member 44. Consequently, the first connecting section P1 can also serve as a vent to remove air from the cooling water. Consequently, the entire catalyst member 44 can be cooled more efficiently. The second connecting section P2 to which the first bypass passage 61 connects is positioned above the cylinder unit 20. Consequently, the passage length of the first bypass passage 61 can be shortened.

Figure 11:
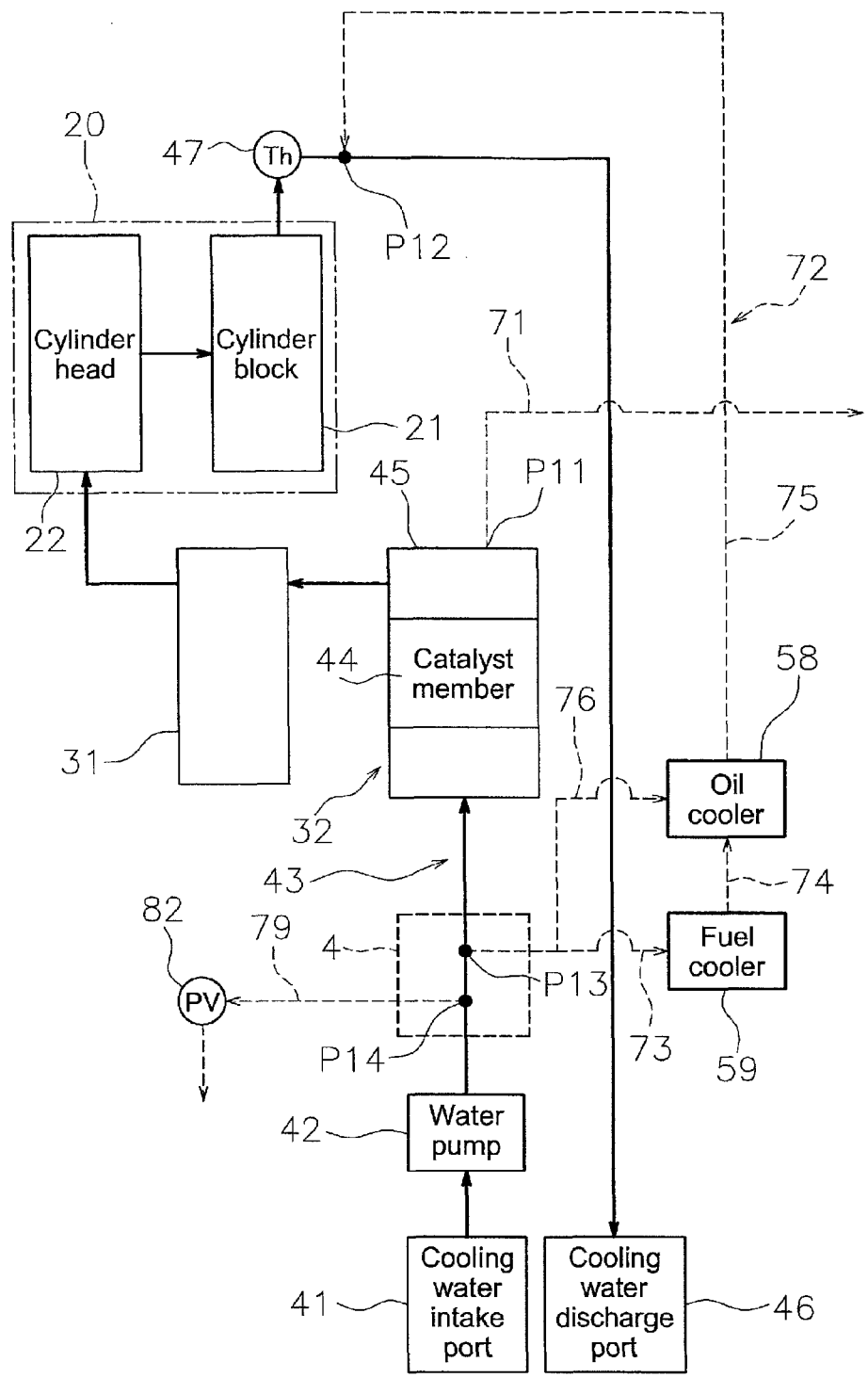
FIG. 11 is a block diagram of a cooling system of an outboard motor according to a second preferred embodiment of the present invention.
Figure 12:
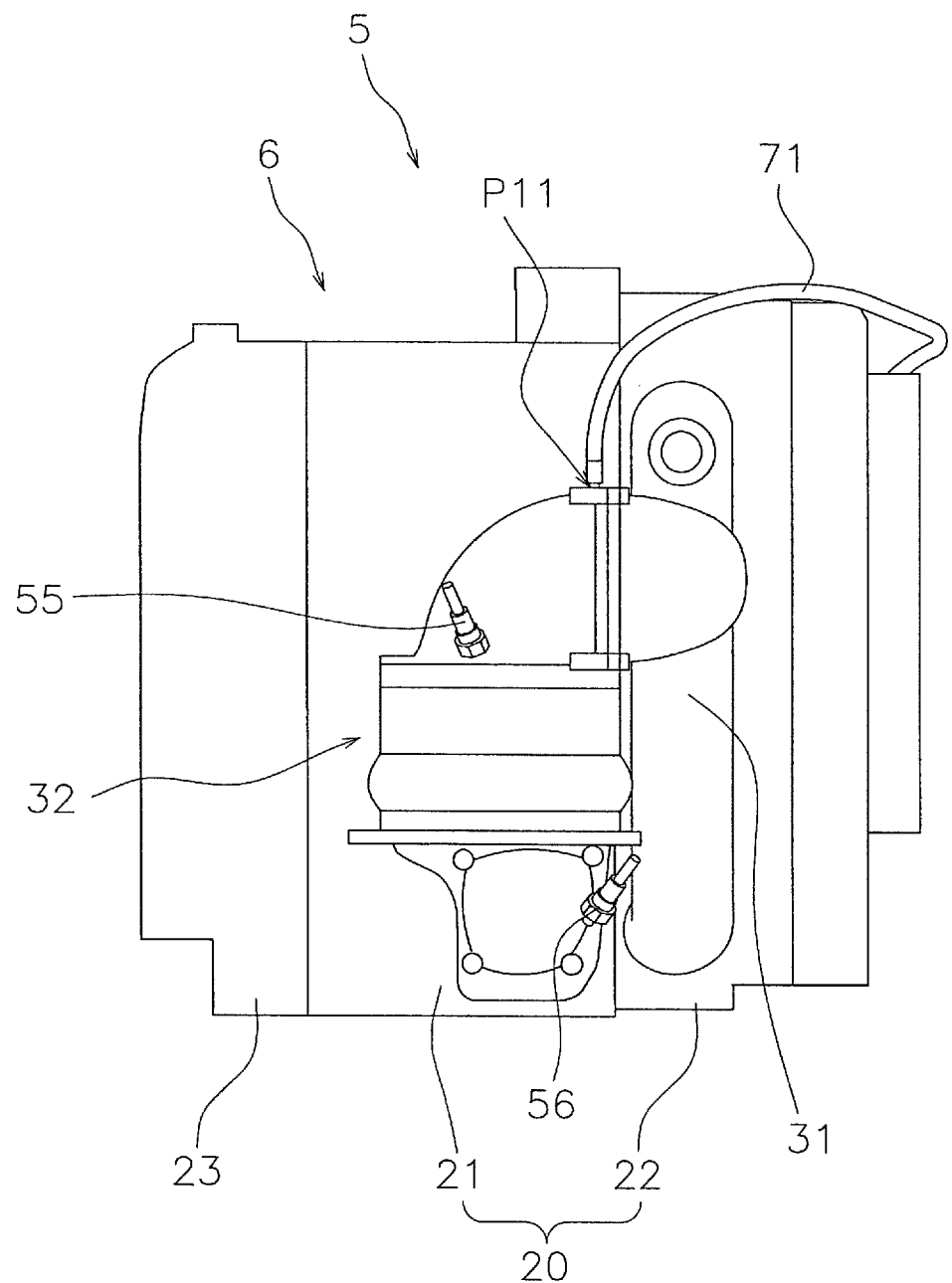
FIG. 12 is a left side view of an engine unit of the outboard motor according to the second preferred embodiment of the present invention.
Figure 13:
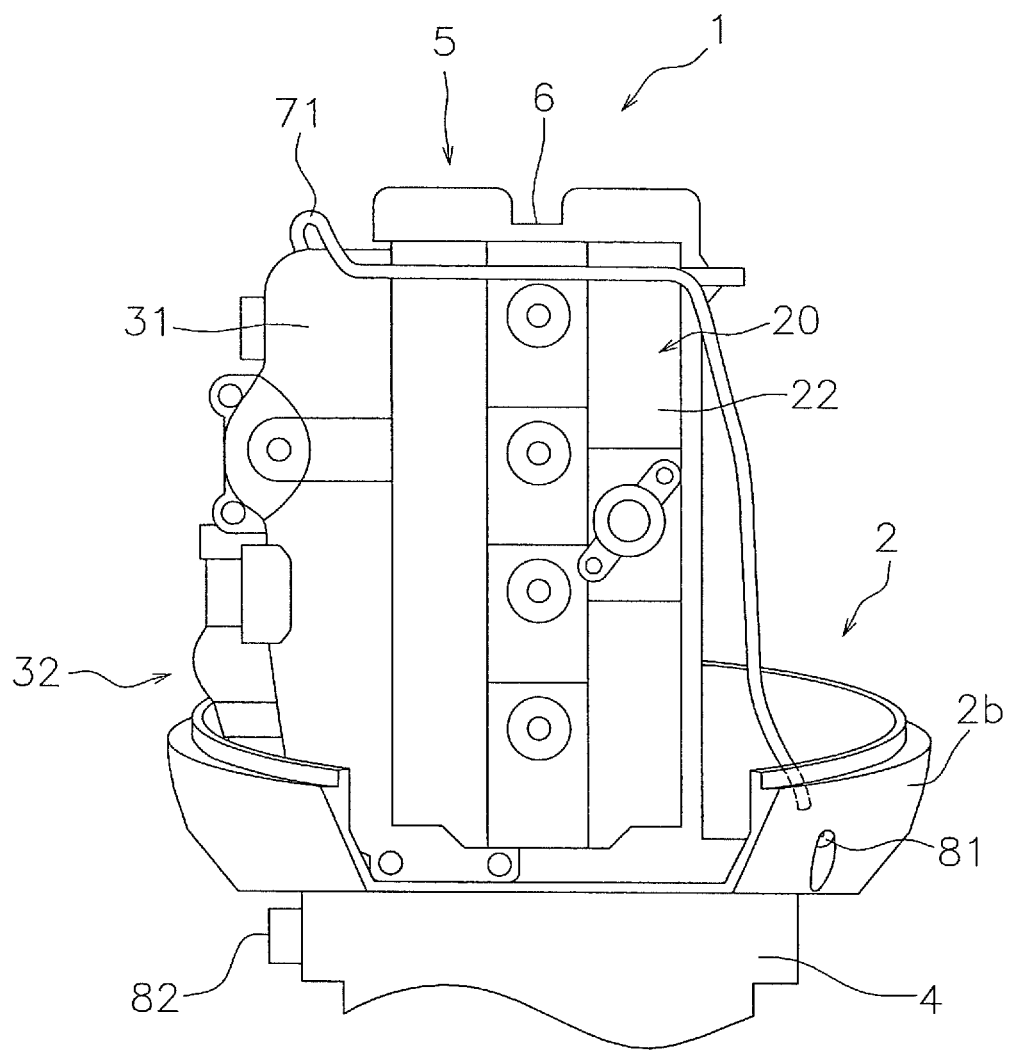
FIG. 13 is a rear view of an engine unit and of a portion of an engine cover of the outboard motor according to the second preferred embodiment of the present invention.

An outboard motor according to a second preferred embodiment of the present invention will now be explained. Elements of the outboard motor according to the second preferred embodiment that are the same as the elements of the outboard motor 1 according to the first preferred embodiment are assigned the same reference numerals. FIG. 11 is a block diagram of a cooling system of an outboard motor according to the second preferred embodiment. FIG. 12 is a left side view of the engine unit 5. FIG. 13 is a rear view of a portion of the engine cover 2 and the engine unit 5.

As shown in FIG. 11, the cooling system of the outboard motor according to the second preferred embodiment includes a first bypass passage 71 and a second bypass passage 72. The first bypass passage 71 is arranged to discharge a portion of the cooling water flowing downstream from the catalyst member 44 in the cooling passage 43 to the exterior of the outboard motor. More specifically, the first bypass passage 71 connects between a first connecting section P11 of the cooling water passage 43 and a pilot water hole 81 shown in FIG. 13. As shown in FIG. 11, the first connecting section P11 is positioned along the cooling water passage 43 farther downstream than the catalyst member 44 and further upstream than the thermostat 47. The first connecting section P11 is arranged similarly to the first connecting section P1 of the first preferred embodiment. That is, the first connecting section P11 is arranged on an upper portion of the catalytic converter unit 32. As shown in FIG. 13, the pilot water hole 81 is provided in the engine cover 2. More specifically, the engine cover 2 includes an upper cover 2a (see FIGS. 4 and 6) and a lower cover 2b, and the pilot water hole 81 is provided in the lower cover 2b. As shown in FIG. 12 and FIG. 13, the first bypass passage 71 preferably includes a hose-shaped member arranged on the exteriors of the engine 6, the exhaust manifold 31, and the catalytic converter unit 32. The first bypass passage 71 extends upward from the catalytic converter unit 32, passes behind the cylinder unit 20, and extends to a lateral surface on the opposite side of the engine 6. Otherwise the constituent features of the first bypass passage 71 are preferably the same as those of the first bypass passage 61 of the first preferred embodiment.

As shown in FIG. 11, the second bypass passage 72 connects between a third connecting section P13 and a second connecting section P12 along the cooling water passage 43. The second connecting section P12 is arranged similarly to the second connecting section P2 of the first preferred embodiment. That is, the second connecting section P12 is positioned inside the thermostat cover 48 immediately downstream of the thermostat 47. The third connecting section P13 is positioned farther upstream than the cylinder unit 20 along the cooling water passage 43. The third connecting section P13 is preferably positioned farther upstream than the catalyst member 44 along the cooling water passage 43. More specifically, the third connecting section P13 is arranged inside the exhaust guide section 4. The second bypass passage 72 preferably has a smaller cross sectional area than the cooling water passage 43. For example, the cross sectional area of the second bypass passage 72 preferably is equal to or larger than about 1/40 and smaller than or equal to about 1/10 of the cross sectional area of the cooling water passage 43, for example. The second bypass passage 72 is arranged to pass through the fuel cooler 59 and the oil cooler 58. More specifically, the second bypass passage 72 includes a first passage 73, a second passage 74, a third passage 75, and a fourth passage 76. The first passage 73 connects between the third connecting section P13 and the fuel cooler 59. The second passage 74 connects between the fuel cooler 59 and the oil cooler 58. The third passage 75 connects between the oil cooler 58 and the second connecting section P12. The fourth passage 76 branches from the first passage 73 and connects to the oil cooler 58. The fourth passage 76 is preferably arranged inside the exhaust guide section 4 and the cylinder unit 20.

Figure 14:
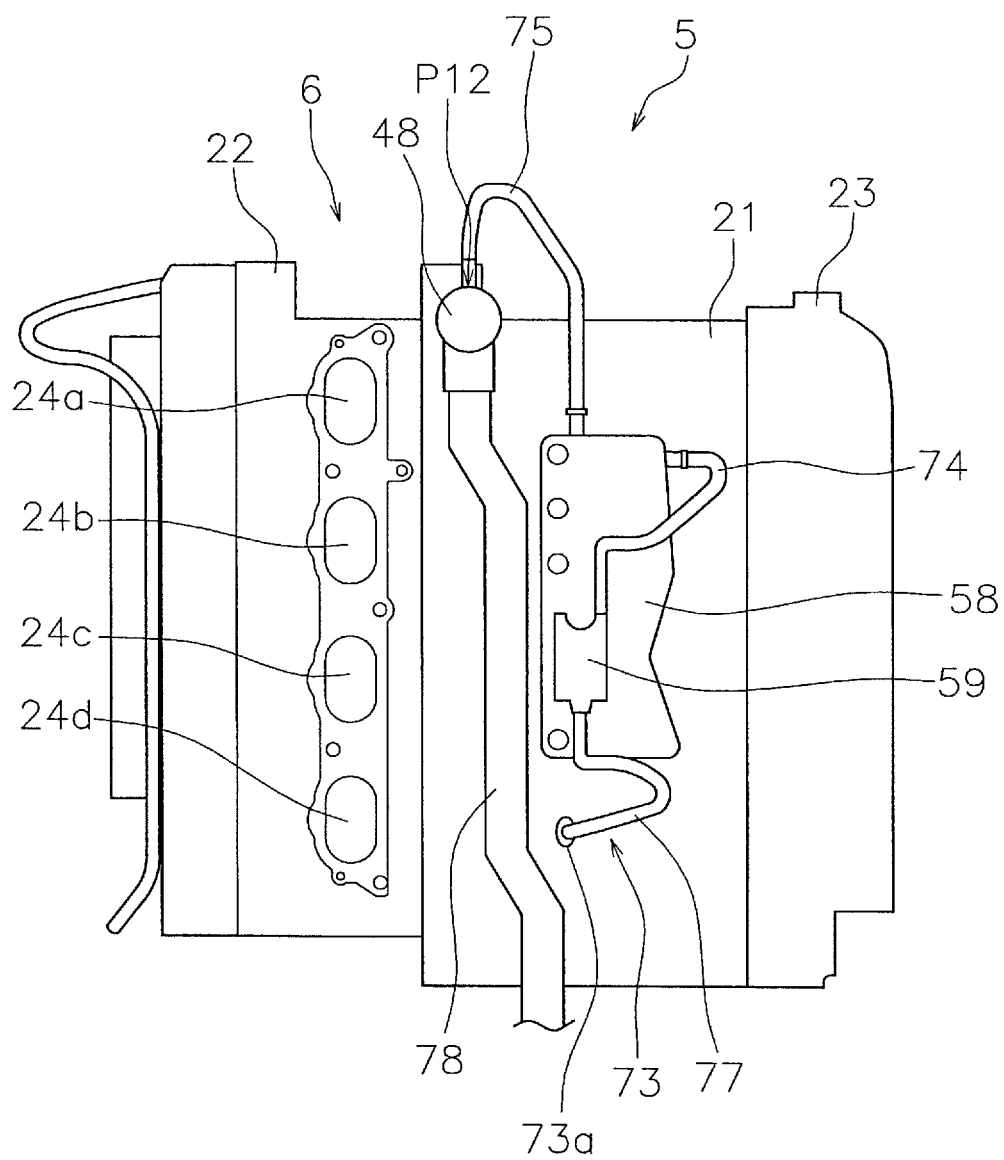
FIG. 14 is a right side view of the engine unit of the outboard motor according to the second preferred embodiment of the present invention.

A portion of the first passage 73 is preferably arranged inside the exhaust guide section 4 and the cylinder unit 20. FIG. 14 is a right side view of the engine unit 5 of the outboard motor according to the second preferred embodiment. The first passage 73 includes a pipe section 77. The pipe section 77 connects between an outlet port 73a provided in the cylinder unit 20 and the fuel cooler 59. The pipe sections of the first passage 73, the second passage 74, and the third passage 75 are preferably arranged on the exteriors of the engine 6, the exhaust manifold 31, and the catalytic converter unit 32. The second passage 74 includes a pipe-shaped member. The third passage 75 includes a pipe-shaped member. The thermostat cover 48 and the oil cooler 58 are preferably arranged on the same side of the engine 6. The third passage 75 extends upward from an upper portion of the oil cooler 58 and connects to the thermostat cover 48.

Figure 15:
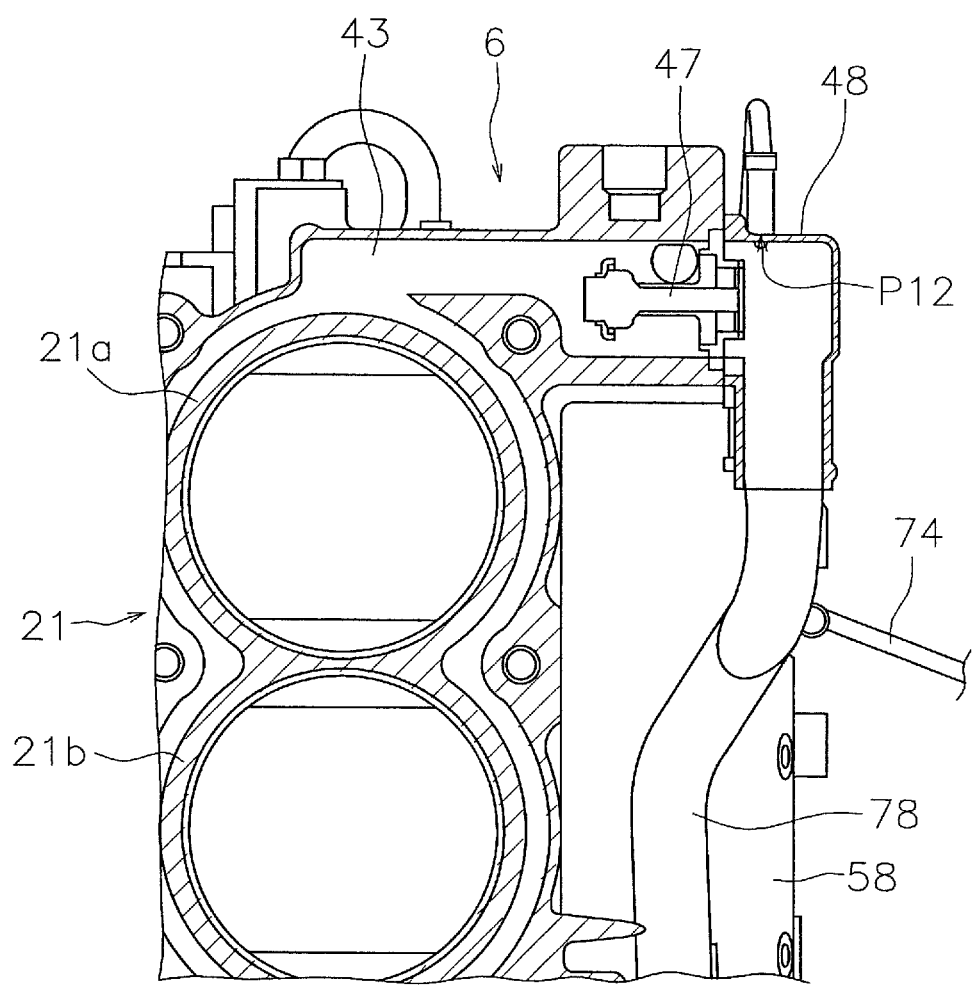
FIG. 15 is a rearward-looking cross sectional view of a portion of the engine of the outboard motor according to the second preferred embodiment of the present invention.

FIG. 15 is a rearward-looking cross sectional view of a portion of the engine 6. As shown in FIG. 15, the thermostat 47 is arranged inside the cylinder block 21. The thermostat 47 is arranged such that its center axis extends in the horizontal or substantially horizontal direction. The thermostat cover 48 is arranged laterally of the thermostat 47. The thermostat cover 48 is attached to the cylinder block 21. A cooling water passage member 78 is connected to the thermostat cover 48. The cooling water passage member 78 is connected to a lower portion of the thermostat cover 48. As shown in FIG. 14, the cooling water passage member 78 extends downward along the right side surface of the engine 6 from the thermostat cover 48. Otherwise, the constituent features of the cooling water passage member 78 are preferably the same as those of the cooling water passage member 49 of the first preferred embodiment.

As shown in FIG. 11, the cooling system of the outboard motor according to the second preferred embodiment includes a third bypass passage 79. The third bypass passage 79 connects to the fourth connecting section P14. The fourth connecting section P14 is positioned farther upstream along the cooling water passage 43 than the catalyst member 44. More specifically, the fourth connecting section P14 is preferably arranged inside the exhaust guide section 4. A water pressure control valve 82 is arranged in the third bypass passage 79. As shown in FIG. 13, the water pressure control valve 82 is attached to the exhaust guide section 4. Otherwise, the constituent features of the water pressure control valve 82 are preferably the same as those of the water pressure control valve 57 of the first preferred embodiment.

The outboard motor according to the second preferred embodiment exhibits the same effects as the outboard motor 1 according to the first preferred embodiment. The cooling water passing through the first bypass passage 71 is discharged from the pilot water hole 81. Thus, the cooling water passing through the first bypass passage 71 can be used as pilot water.

Cooling water that has passed through the oil cooler 58 and the fuel cooler 59 is supplied to the thermostat cover 48 through the second bypass passage 72. Consequently, when the thermostat 47 is frozen, the thermostat 47 can be defrosted more quickly.

A portion of the first passage 73 of the second bypass passage 72 and the fourth passage 76 are preferably arranged inside the exhaust guide section 4 and the cylinder unit 20. Consequently, the number of hoses, pipes, and other component elements can be decreased. The amount of work required to assemble the engine unit 5 can also be decreased.

Although preferred embodiments of the present invention are explained herein, the present invention is not limited to the preferred embodiments and various changes can be made without departing from the scope of the invention.

The number of cylinders is not limited to four. Three or fewer cylinders is also acceptable. It is also acceptable to include five or more cylinders.

Figure 16:
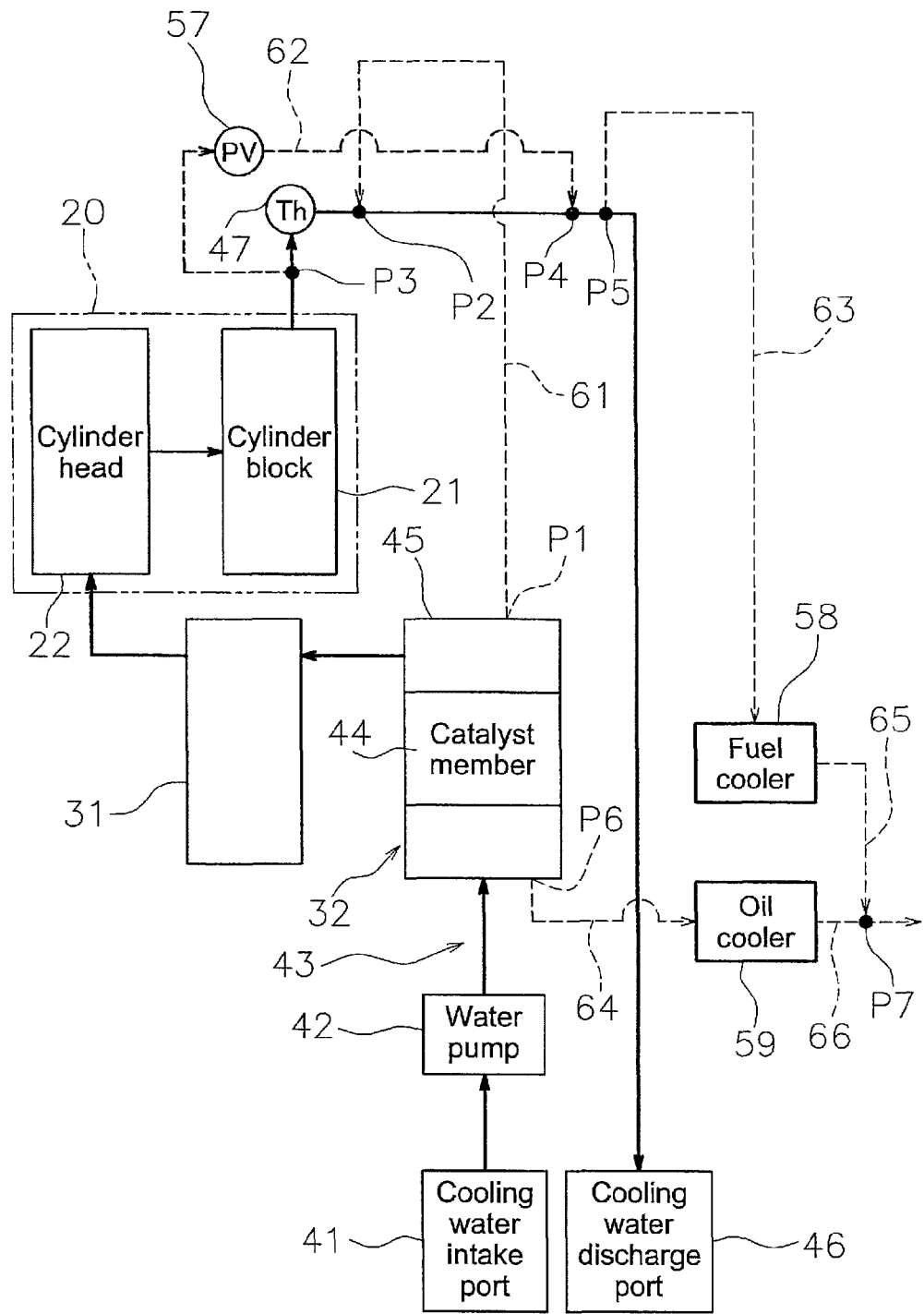
FIG. 16 is a block diagram of a cooling system of an outboard motor according to another preferred embodiment of the present invention.
Figure 17:
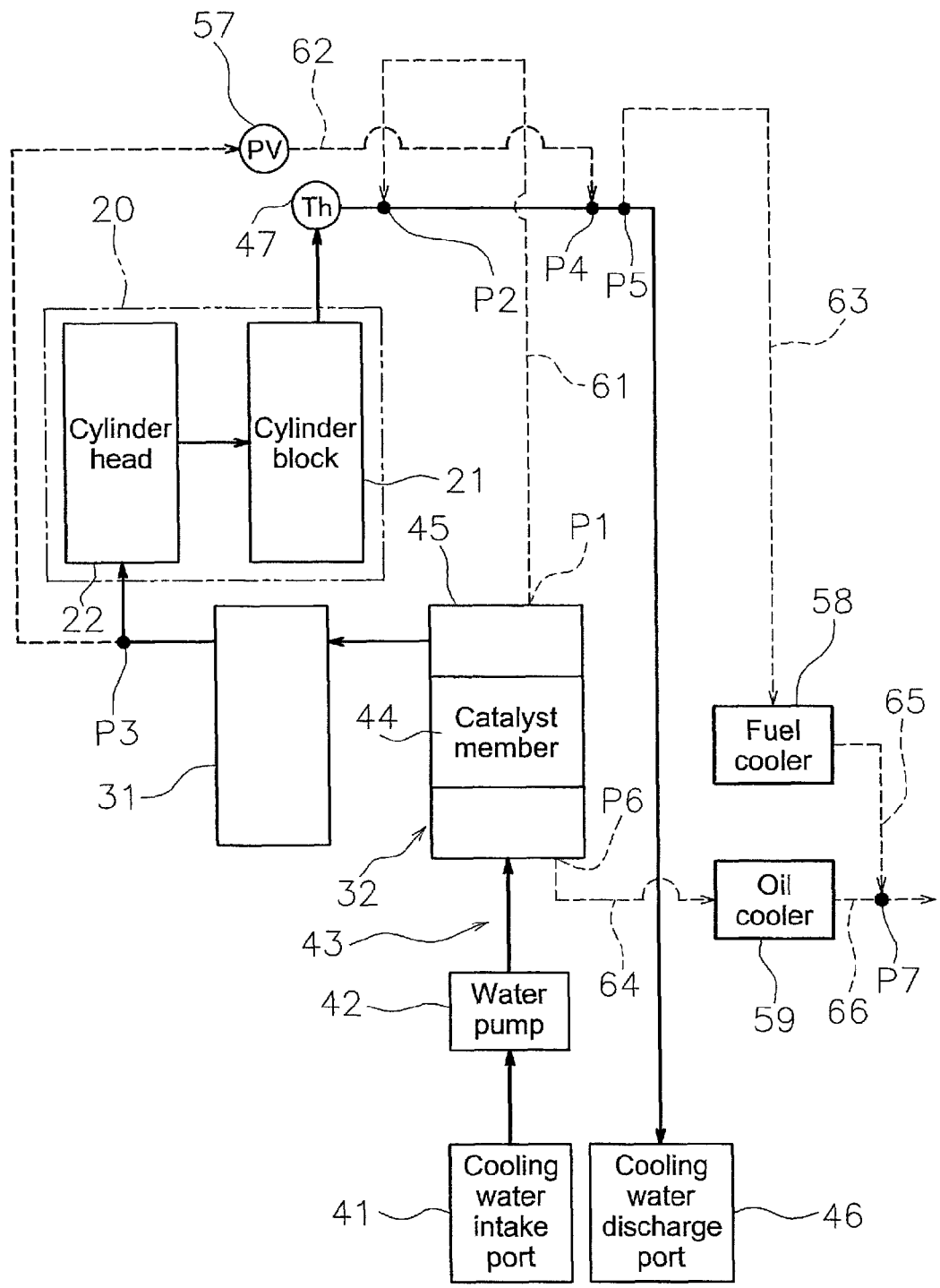
FIG. 17 is a block diagram of a cooling system of an outboard motor according to another preferred embodiment of the present invention.

The positions of the first to seventh connecting sections P1 to P7 in the first preferred embodiment are not limited to the positions explained previously. For example, in the first preferred embodiment, it is acceptable for the first connecting section P1 to be positioned farther downstream than the catalytic converter unit 32. It is also acceptable for the second connecting section P2 to be positioned farther downstream than the fourth connecting section P4. Although in the previously explained preferred embodiments the third connecting section P3 is positioned between the cylinder head 22 and the cylinder block 21, it is also acceptable for the third connecting section P3 to be positioned downstream of the cylinder unit 20 as shown in FIG. 16. It is also acceptable for the third connecting section P3 to be positioned between the catalyst member 44 and the cylinder unit 20 as shown in FIG. 17.

The positions of the first to fourth connecting sections P11 to P14 in the second preferred embodiment are not limited to the positions explained previously. For example, in the second preferred embodiment, it is acceptable for the first connecting section P11 to be positioned farther downstream than the catalytic converter unit 32. The third connecting section P13 is arranged on the exterior of the exhaust guide section 4. The pilot water hole 81 is not limited to being positioned on the lower cover 2b and is acceptably positioned on another portion of the outboard motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
an engine including a cylinder unit;
an exhaust passage arranged to guide exhaust gas discharged from the cylinder unit to underneath the engine;
a catalytic converter provided in the exhaust passage;
a cooling water passage arranged to guide cooling water to cool the exhaust passage and the cylinder unit;
a cooling water intake port arranged to draw the cooling water into the cooling water passage;
a water pump arranged to draw the cooling water from the cooling water intake port and supply the cooling water to the cooling water passage;
a thermostat arranged farther downstream along the cooling water passage than the catalytic converter and the cylinder unit; and
a first bypass passage connected to a first connecting section in the cooling water passage at a position farther downstream than the catalytic converter and farther upstream than the thermostat.

2. The outboard motor according to claim 1, wherein the first bypass passage is arranged to discharge a portion of the cooling water flowing downstream from the catalyst member in the cooling passage to an exterior of the outboard motor.

3. The outboard motor according to claim 1, further comprising an engine cover that houses the engine and includes a pilot water hole, wherein the first bypass passage is connected to the pilot water hole.

4. The outboard motor according to claim 1, further comprising a second bypass passage connected between a second connecting section positioned farther downstream than the thermostat along the cooling water passage and a third connecting section positioned farther upstream than the cylinder unit along the cooling water passage.

5. The outboard motor according to claim 4, further comprising an oil cooler, wherein the second bypass passage is arranged to pass through the oil cooler.

6. The outboard motor according to claim 4, further comprising a fuel cooler, wherein the second bypass passage is arranged to pass through the fuel cooler.

7. The outboard motor according to claim 4, wherein the third connecting section is positioned farther upstream than the catalytic converter along the cooling water passage.

8. The outboard motor according to claim 4, wherein the second connecting section is positioned immediately downstream of the thermostat along the cooling water passage.

9. The outboard motor according to claim 8, wherein the cooling water passage includes a thermostat cover that covers the thermostat, and the second connecting section is provided on the thermostat cover.

10. The outboard motor according to claim 1, wherein the first bypass passage connects between the first connecting section and a second connecting section positioned farther downstream than the thermostat along the cooling water passage.

11. The outboard motor according to claim 10, wherein the second connecting section is positioned immediately downstream of the thermostat along the cooling water passage.

12. The outboard motor according to claim 11, wherein the cooling water passage includes a thermostat cover that covers the thermostat, and the second connecting section is provided on the thermostat cover.

13. The outboard motor according to claim 1, further comprising:
a second bypass passage that connects between a third connecting section positioned farther downstream than the catalytic converter along the cooling water passage and a fourth connecting section positioned farther downstream than the thermostat along the cooling water passage; and
a water pressure control valve arranged in the second bypass passage.

14. The outboard motor according to claim 13, wherein the catalytic converter is positioned farther upstream than the cylinder unit along the cooling water passage, and the third connecting section is positioned inside the cylinder unit or farther downstream than the cylinder unit along the cooling water passage.

15. The outboard motor according to claim 14, wherein:
the cylinder unit includes a cylinder head and a cylinder block;
the cylinder head is positioned farther upstream than the cylinder block along the cooling water passage; and
the third connecting section is positioned between the cylinder head and the cylinder block along the cooling water passage.

16. The outboard motor according to claim 13, wherein the third connecting section is positioned between the catalytic converter and the cylinder unit along the cooling water passage.

17. The outboard motor according to claim 4, wherein the second connecting section is positioned above the cylinder unit.

18. The outboard motor according to claim 1, wherein the catalytic converter is arranged laterally of the engine.

19. The outboard motor according to claim 1, wherein the first connecting section is positioned above the catalytic converter.

20. The outboard motor according to claim 1, wherein a cross sectional area of the first bypass passage is smaller than a cross sectional area of the cooling water passage.

* * * * *